(12) United States Patent
Hoff

(10) Patent No.: US 7,407,458 B2
(45) Date of Patent: Aug. 5, 2008

(54) IN-LINE DRIVETRAIN AND FOUR WHEEL DRIVE WORK MACHINE USING SAME

(75) Inventor: Brian Hoff, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 157 days.

(21) Appl. No.: 11/258,961

(22) Filed: Oct. 26, 2005

(65) Prior Publication Data

US 2007/0093343 A1    Apr. 26, 2007

(51) Int. Cl.
B60K 17/16 (2006.01)
B60K 17/22 (2006.01)
B60K 17/34 (2006.01)
B60K 17/356 (2006.01)

(52) U.S. Cl. .................. 475/150; 475/221; 475/222
(58) Field of Classification Search .......... 475/221, 475/222, 150
See application file for complete search history.

(56) References Cited

U.S. PATENT DOCUMENTS

| 1,679,805 | A | * | 8/1928 | Blumer .................... 180/24.04 |
| 4,898,428 | A | | 2/1990 | Weber |
| 5,188,193 | A | * | 2/1993 | Schroeder .................. 180/242 |
| 6,557,659 | B1 | | 5/2003 | Kurzeja et al. |
| 6,579,201 | B2 | | 6/2003 | Bowen |
| 6,881,168 | B2 | | 4/2005 | Bowen |
| 2002/0160874 | A1 | | 10/2002 | Bowen et al. |
| 2003/0116371 | A1 | | 6/2003 | Sakazaki |
| 2004/0216942 | A1 | | 11/2004 | Tanaka et al. |
| 2005/0037883 | A1 | | 2/2005 | Motoike et al. |
| 2005/0115748 | A1 | | 6/2005 | Lanier |
| 2006/0030448 | A1 | | 2/2006 | Almaguer |

FOREIGN PATENT DOCUMENTS

| DE | 2910689 | 9/1979 |
| DE | 37 10 582 | 11/1987 |
| EP | 1459927 | 9/2004 |
| JP | 04087836 | 3/1992 |

OTHER PUBLICATIONS

A Dependable LHD Designed Specifically For Load-Haul-Dump Applications Underground Elphinstone R1700 Series II, 1995, pp. 1-7, Caterpillar Elphinstone Pty.Ltd. Burnie, Tasmania, Australia.

* cited by examiner

*Primary Examiner*—Sherry Estremsky
*Assistant Examiner*—Edwin A Young
(74) *Attorney, Agent, or Firm*—Liell & McNeil

(57) ABSTRACT

A four wheel drive articulated mine loader is powered by a fuel cell and propelled by a single electric motor. The drivetrain has the first axle, second axle, and motor arranged in series on the work machine chassis. Torque is carried from the electric motor to the back differential via a pinion meshed with the ring gear of the back differential. A second pinion oriented in an opposite direction away from the ring gear is coupled to a drive shaft to transfer torque from the ring gear to the differential of the front axle. Thus, the ring gear of the back differential acts both to receive torque from the motor and to transfer torque to the forward axle. The in-line drive configuration includes a single electric motor and a single reduction gear to power the four wheel drive mine loader.

16 Claims, 4 Drawing Sheets

IN-LINE DRIVETRAIN AND FOUR WHEEL DRIVE WORK MACHINE USING SAME

STATEMENT OF GOVERNMENT RIGHTS

This invention was made with U.S. Government support under Contract No. DE-FC36-01G011095, awarded by the U.S. Department of Energy. The U.S. Government has certain rights in this invention.

TECHNICAL FIELD

The present disclosure is directed generally to in-line drivetrains, more particularly to a four wheel drive vehicle that utilizes an in-line drivetrain powered by an electric motor.

BACKGROUND

In an ongoing effort to further reduce undesirable emissions from motor vehicles, engineers have begun to consider alternatives to internal combustion engines as a means of propelling the vehicle. One potential alternative is to employ one or more electric motors powered by an appropriate electrical source, such as a fuel cell. In the case of four wheel drive vehicles, such as articulated wheel loader work machines, there are many alternative potential strategies that each deserve consideration. For instance, a four wheel drive work machine could be constructed with a separate electrical motor on each of its four wheels. However, such a solution could be cost prohibitive and difficult to control. Another alternative might be to include separate electrical motors for each of the two axles such as that taught by Sakazaki in U.S. Patent Application US 2003/0116371. Although this strategy might be more attractive than the four motor strategy, it still requires two electrical motors, two sets of controllers, and likely duplicate pairs of other relatively expensive components, such as reduction gears to link the motors to their respective axles.

Another potential problem associated with some four wheel drive work machines relates to packaging the various power plant(s), motor(s), work implement, etc. in an envelope that renders the machine a realistic alternative to existing work machines that rely upon conventional internal combustion engines. These challenges can be especially difficult in relation to some applications, such as wheel loaders utilized in underground mining operations.

The present disclosure is directed to overcoming one or more of the problems set forth above.

SUMMARY OF THE DISCLOSURE

In one aspect, a four wheel drive vehicle includes a motor, a first axle with a first differential, and a second axle with a second differential connected to a chassis. A first drive shaft is coupled between the first differential and the second differential. A second drive shaft is coupled between the motor and the first differential, on a side of the first differential opposite from the first drive shaft.

In another aspect, a drivetrain includes a first differential with a ring gear, a first side and a second side. A first pinion is meshed with the ring gear and has a first shaft extending toward the first side. In addition, a second pinion is meshed with the ring gear and has a second shaft extending toward the second side. A motor is operably coupled to one of the first and second pinions. A driven element is operably coupled to the other of the first and second pinions.

In another aspect, a method of operating a four wheel drive vehicle includes a step of torquing a ring gear of a first differential coupled to a first axle with a motor. Torque is transferred from the first differential to a second differential coupled to second axle via a drive shaft coupled to the ring gear.

DETAILED DESCRIPTION

Figure 1:
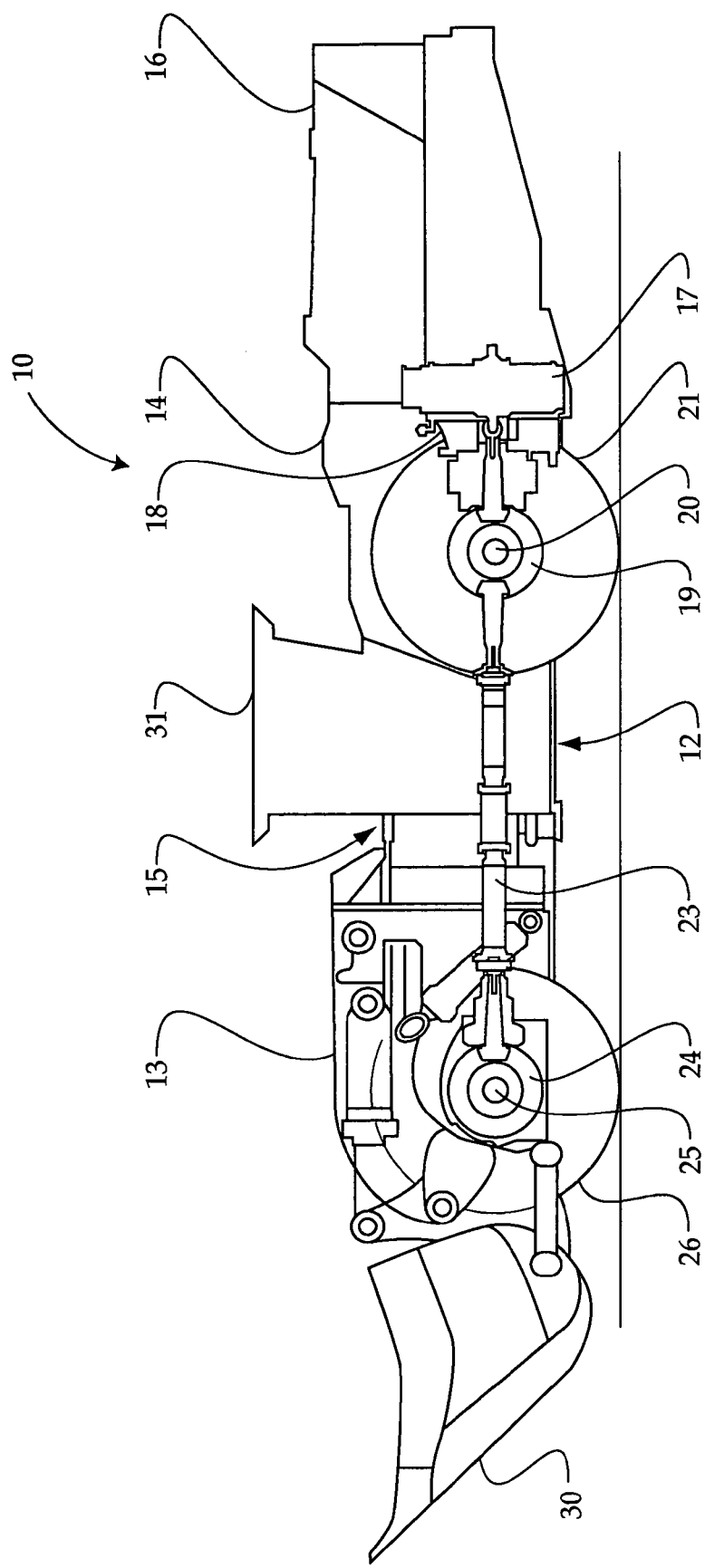
FIG. 1 is a side diagrammatic view of a work machine according to the present disclosure.

Referring to FIG. 1, a work machine 10, which is illustrated as an underground mine loader, includes a chassis made up of a front portion 13 joined to a back portion 14 at an articulation 15. A power plant 16 is mounted on back portion 14 and provides torque to a back differential 19, which is operable to drive the rotation of axle 20 and rear wheels 21 in a conventional manner. Although the present disclosure does not rule out the possibility that power plant 16 could be a conventional internal combustion engine coupled to differential 19 via a transmission and clutch mechanism, the illustrated embodiment includes a fuel cell and battery that supply electrical energy to an electric motor 17 which is coupled to differential 19 via a reduction gear 18. Additionally any power source could be used to power the vehicle, such as a diesel turbine, or microturbine powered generator without departing from an intended scope of this disclosure. In this embodiment, the torque supplied to back differential 19 is transferred to front differential 14 via a drive shaft 23. Front differential 24 applies torque to drive rotation of axle 25 and front wheels 26 in a conventional manner. Thus, work machine 10 is a four wheel drive vehicle, which in this embodiment includes a moveable bucket 30 attached to the front portion 13, and an operator control station 31 attached to the back portion 14. Although the envelope of underground mine loader 10 is similar to tat of previous like machines that utilize an internal combustion engine, the mine loader 10 utilizes an electric motor 17 that is arranged in series with back differential 19 and front differential 24. As per the conventional design shown in FIG. 1, the chassis is completely supported by back and front wheels 21, 26 attached to the back and front axles 20, 25.

Figure 2:
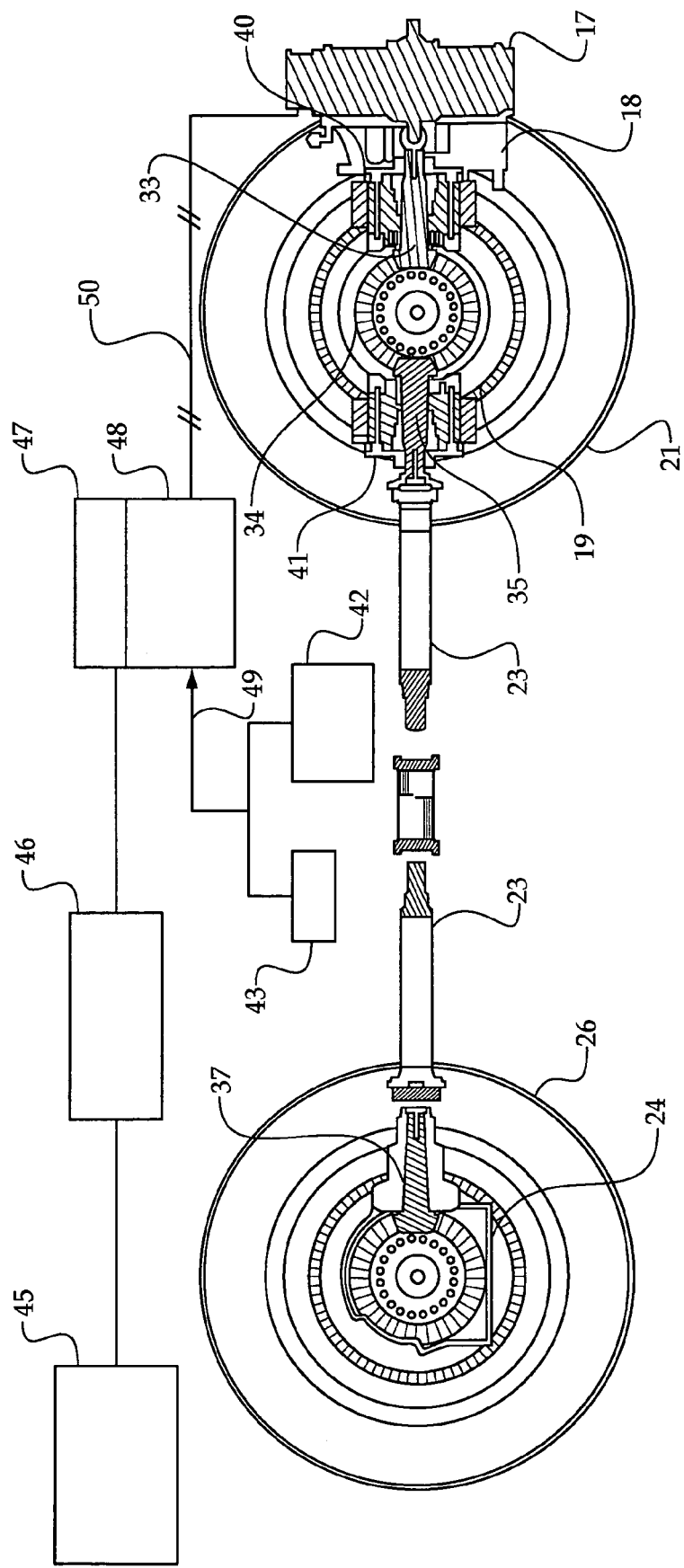
FIG. 2 is a schematic illustration of a drivetrain for the work machine of FIG. 2.
Figure 3:
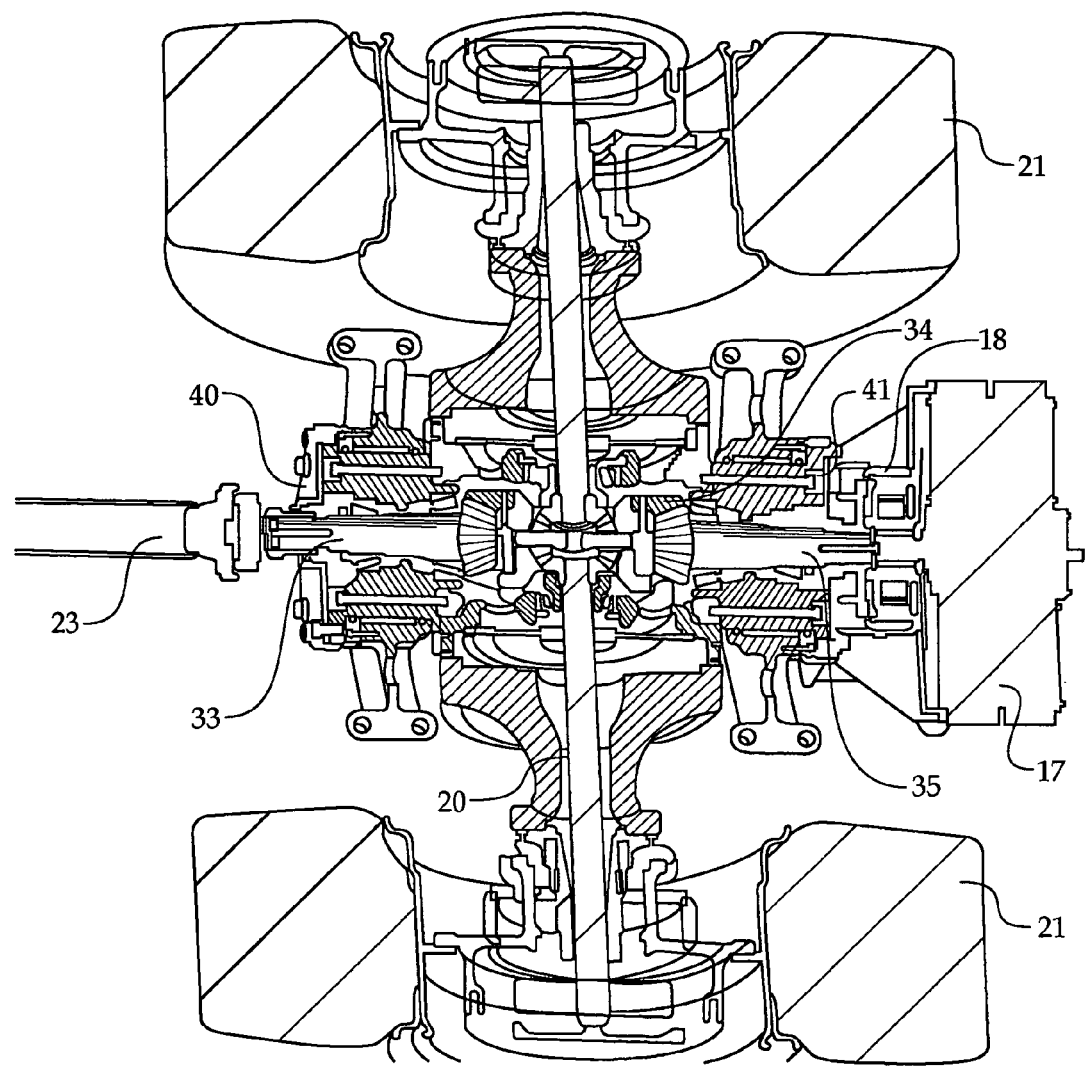
FIG. 3 is a sectioned bottom view of a portion of the drivetrain of FIG. 2.
Figure 4:
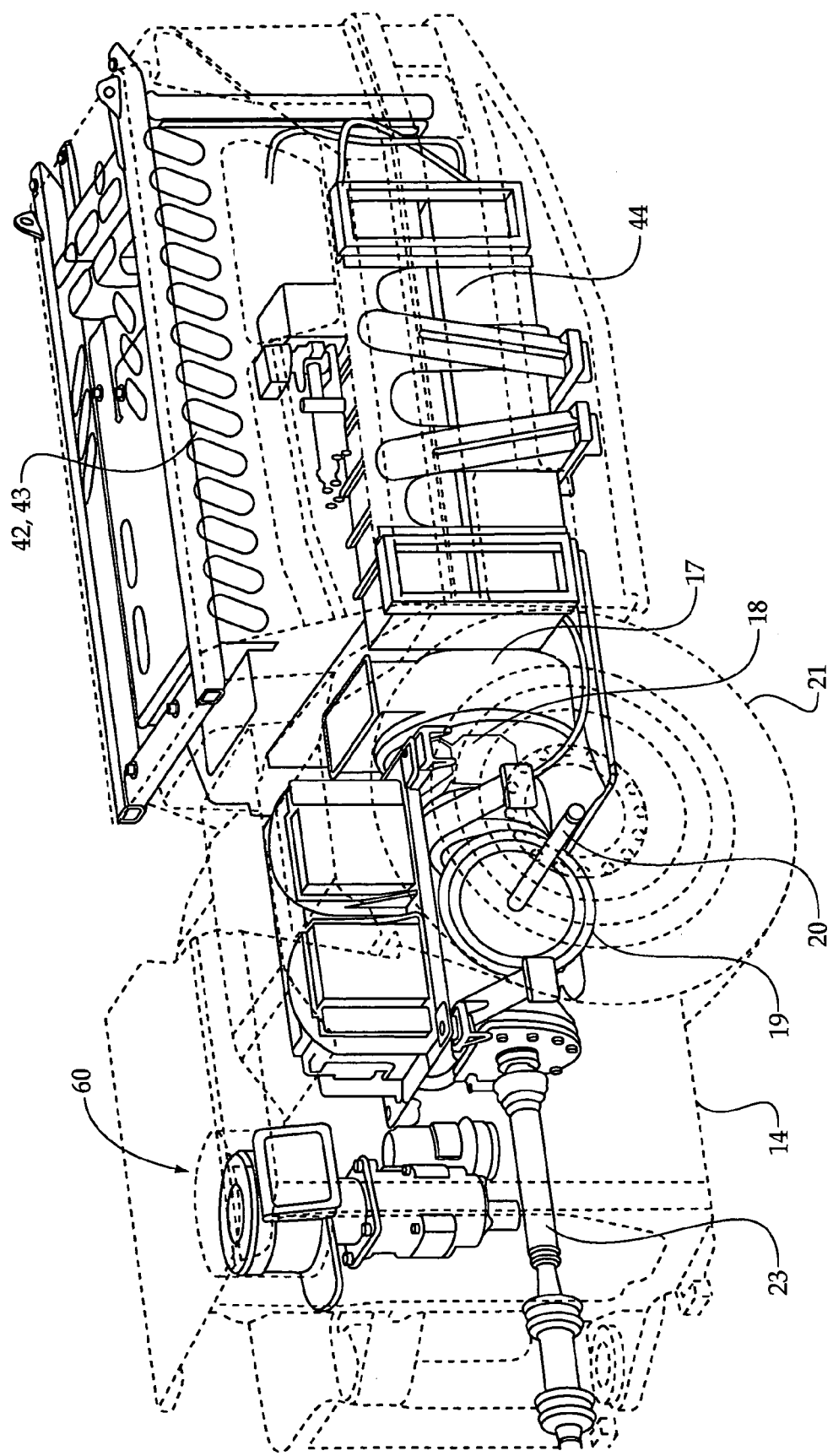
FIG. 4 is an isometric view of a back portion of the work machine of FIG. 1.

Referring now in addition to FIGS. 2-4, various features of the drivetrain and other aspects of the mine loader 10 are shown apart from chassis 12 for clarity. The power plant 16 identified in FIG. 1 may include a fuel cell 42 and a battery 43 that deliver electric power via a line 49 to a motor controller 48. The motor controller may be controlled directly by a dedicated electronic control module 47, which may communicate with a vehicle electronic control module 46, which in turn may receive commands from a throttle pedal 45 mounted in a operator control station 31. Thus, when the operator moves throttle pedal 45, an appropriate command may be sent to vehicle electronic control module 46, that in turn sends a command to the drive electronic control module 47, which makes an appropriate adjustment to motor controller 48 so that electrical power is supplied to electric motor 17 via electrical power line 50. Electric motor 17 responds by rotating with a torque at a specific speed. This speed is reduced, and the torque increased through a reduction gear 18 in a conventional manner before the torque is supplied to back differential 19.

The back differential 19 includes a first side 40 that faces electric motor 17, and a second face 41 that faces toward front differential 24. The electric motor is coupled to back differential 19 via a first pinion 33 that is meshed with a ring gear 34 and includes a drive shaft extending in the direction of side 40. Ring gear 34 is coupled to back axle 20 in a conventional manner, but also transfers torque to drive shaft 23 via a second pinion 35 that is meshed with ring gear 34 and includes a shaft extending in the direction of side 41. Thus, unlike many differentials, the ring gear 34 of back differential 19 not only is a driven element, but also transfers torque to drive shaft 23 via pinion 35. Although a differential substantially without modification could be utilized, its life could be extended in this application by substituting a ring gear 34 into the conventional differential that includes extra hardening over that of an identical differential that is only a driven element. In other words, since ring gear could be expected to experience substantially more and different stresses than that of a counterpart simply driven ring gear of a conventional differential, some additional hardening may be prudent in order to extend its life when it is utilized in a drivetrain application such as that illustrated, in which it not only is a driven element but also transfers torque to another pinion.

As best shown in FIGS. 1-3, electric motor 17, first pinion 33 and second pinion 35 all preferably have collinear axes of rotation. Thus, the axes of rotation of electric motor 17 can be thought of as intersecting back axle 20. Those skilled in the art will appreciate that this allows for the usage of a conventional differential 19 that has been modified only in that it includes a pair of substantially identical pinions 33 and 35 oriented 180° apart in opposite directions. Nevertheless, those skilled in the art will appreciate that neither the pinions 33 and 35 nor electric motor 17 need necessarily have collinear axes of rotation. In addition, electric motor 17, or possibly a crank shaft of an engine, could be elevated on work machine 10, and coupled to drive pinion 33 via a conventional drop box as is known in the art. In addition, other configurations could be utilized such as reorienting electric motor 17, reduction gear 18 and pinion 33 about an angle with respect to ring gear 35, such that motor 17 and reduction gear 18 are mounted higher on work machine 10, with the axes of rotation at an angle other than 180° apart. However, such an alteration would require modifications differential 19, whereas the illustrated configuration allows for off-the-shelf differential components.

Referring now specifically to FIG. 4, some of the other features of work machine 10 are shown as they are packaged on back portion 14 of the chassis 12. In particular, a hydraulic pump motor 60 is mounted forward of axle 20 can serve as a means by which hydraulic fluid is pressured for operating moveable bucket 30 (FIG. 1). In addition, a fuel cell—battery hybrid power plant 42, 43 is mounted behind axle 20 and may be flanked on either side by metal-hydride storage, for supplying the fuel cell with hydrogen gas. All of the various components discussed are connected to the chassis 12 in a conventional manner. For instance, motor 17 would likely be attached to reduction gear 18 and back differential 19, which may then be attached to chassis 12 via trunions in a conventional manner.

INDUSTRIAL APPLICABILITY

The drivetrain of the present disclosure finds potential application in any instance where a motor is utilized to apply torque to an axle and at least one other thing, such as a second axle, via a differential. The second driven thing could be a pump or some other component. In addition, the illustrated embodiment shows the ring gear 34 transferring torque to one pinion, but the disclosure contemplates torque transfer to two or more pinions. In the illustrated embodiment, the motor is an electric motor that is arranged in-line and in sequence with a back axle and a front axle. Thus, in the illustrated embodiment which is applicable for use in a underground mine loader work machine, the motor and axles are arranged in series starting from back to front with the motor being first, the back axle second and the front axle third. In other potential applications, such as on the road vehicles, the arrangement might be just the opposite. In other words, a four wheel drive vehicle could have the electric motor being the forward most component followed from front to rear by the front axle and finally the rear axle and have a drivetrain substantially identical to that disclosed above.

Those skilled in the art will appreciate that the described in-line drive that utilizes an electric motor presents a more compact alternative that has fewer components and parts, and offers other further advantages relative to conventional designs that utilize a diesel engine, a transmission, U joints and drive shaft as well as a drop box. In addition, the differential that is directly coupled to the electric motor can be a nearly off-the-shelf component that is modified only be removing one of its front or rear panels and adding a symmetrical second pinion and support gear. The disclosed embodiment also offers advantages over other electrically driven four wheel drive vehicles in that only a single electric motor and single reduction gear are needed, which can provide a substantial cost savings over the multiple motor and multiple reduction gear alternatives described in the art. Thus, with fewer components and parts, there is reduced costs, and potentially reduced maintenance and reduced parasitic loses for any electrically driven vehicle employing the electrical in-line drive described above.

It should be understood that the above description is intended for illustrative purposes only, and is not intended to limit the scope of the present disclosure in any way. Thus, those skilled in the art will appreciate that other aspects, objects, and advantages of the disclosure can be obtained from a study of the drawings, the disclosure and the appended claims.

What is claimed is:

1. A four wheel drive vehicle, comprising:
a chassis;
a motor connected to the chassis;
a first axle and a first differential coupled to the chassis;
a second axle and a second differential coupled to the chassis;
the chassis being completely supported by wheels attached to the first and second axles;
a first drive shaft coupled between the first differential and the second differential;
a second drive shaft coupled between the motor and the first differential, on a side of the first differential opposite from the first drive shaft;
the motor is an electric motor; and
a reduction gear coupling the second drive shaft to the electric motor.

2. The vehicle of claim 1 wherein the motor has an axis of rotation that intersects the first axle;
the chassis has a front portion connected to a back portion; and
the motor is mounted on the back portion.

3. The vehicle of claim 1 wherein the first drive shaft and the second drive shaft include collinear axes of rotation.

4. The vehicle of claim 1 wherein the first drive shaft includes a first pinion meshed with a ring gear of the first differential; and
the second drive shaft includes a second pinion meshed with the ring gear.

5. The vehicle of claim 4 wherein the first and second pinions are identical.

6. The vehicle of claim 4 wherein the first and second pinions are meshed with the ring gear on opposite sides of the first axle.

7. The vehicle of claim 6 wherein the motor has an axis of rotation that intersects the first axle.

8. The vehicle of claim 7 wherein the first and second pinions have collinear axes of rotation.

9. The vehicle of claim 8 wherein the axis of rotation of the motor is collinear with the axes of rotation of the first and second pinions.

10. The vehicle of claim 4 wherein the first axle is a back axle;
the second axle is a front axle;
the electric motor is aft of the back axle; and
a movable bucket connected to the chassis forward of the front axle.

11. The vehicle of claim 10 wherein the chassis includes a front portion joined to a back portion at an articulation.

12. A drivetrain comprising:
a first differential including a ring gear, and having a first side and a second side opposite the first side, and including a first pinion meshed with the ring gear and having a first shaft extending toward the first side, and further including a second pinion meshed with the ring gear and having a second shaft extending toward the second side;
a motor operably coupled to one of the first and second pinions;
a driven element operably coupled to an other one of the first and second pinions;
the motor, the first differential and the driven element being sequentially positioned from a back toward a front of the drivetrain;
the motor is an electric motor; and
a reduction gear coupled between the electric motor and the first pinion.

13. The drivetrain of claim 12 wherein the first and second pinions have collinear axes of rotation.

14. The drivetrain of claim 13 wherein the driven element includes a second differential operably coupled to the second pinion via a drive shaft; and
an articulation positioned between the first differential and the second differential for articulating the first differential relative to the second differential.

15. The drivetrain of claim 14 wherein the electric motor has an axis of rotation that is collinear with the axis of rotation of the first pinion.

16. A method of operating a four wheel drive vehicle, comprising the steps of:
completely supporting a chassis of the four wheel drive vehicle on wheels attached to first and second axles;
torquing a ring gear of a first differential coupled to the first axle with a motor;
transferring torque from the first differential to a second differential coupled to the second axle via a drive shaft coupled to the ring gear;
arranging the motor, the first differential and the second differential in series on the vehicle from a back toward a front of the vehicle;
articulating a front portion of a chassis relative to a back portion of the chassis via an articulation positioned between the first differential and the second differential; and
electrically powering the motor with at least one of a fuel cell, a battery, a generator and a microturbine.

* * * * *